United States Patent [19]
Berman

[11] Patent Number: 4,653,114
[45] Date of Patent: Mar. 24, 1987

[54] AUTOMATIC TERMINAL SIGNAL EQUALIZATION

[75] Inventor: Michael J. Berman, Horsham, Pa.

[73] Assignee: General Instrument Corporation, New York, N.Y.

[21] Appl. No.: 623,209

[22] Filed: Jun. 21, 1984

[51] Int. Cl.[4] .......................... H04H 1/00; H04B 17/00
[52] U.S. Cl. ............................................. 455/5; 455/4; 455/69
[58] Field of Search .......................... 455/5, 4, 6, 2, 69; 358/86

[56] References Cited

U.S. PATENT DOCUMENTS 4,512,033  4/1985  Schrock ................................. 455/4

Primary Examiner—Robert L. Griffin
Assistant Examiner—M. Huseman
Attorney, Agent, or Firm—Hopgood, Calimafde, Kalil, Blaustein & Judlowe

[57] ABSTRACT

The output signal level of a data node connected with a headend for use in a two-way cable communication network is monitored and adjusted at the node so that the signals received at the headend from all of the nodes in the network are substantially at the same level. The node terminal signal, which includes information identifying the address of the node, is initially transmitted from the node at a minimum level and is thereafter incrementally increased until a correct return signal is detected at the node, thereby indicating that the signal transmitted from that node is at a sufficient level to achieve the desired signal level equalization at the headend.

6 Claims, 4 Drawing Figures

AUTOMATIC TERMINAL SIGNAL EQUALIZATION

The present invention relates generally to cable communication, and more particularly to a two-way cable network which includes means for achieves signal level equalization at the network headend from each node in the network.

In many cable communication networks now in use, in addition to or in place of the more conventional television programming, data is communicated between a central system headend and a plurality of data nodes or terminals connected by means of a cable to the headend and located at sites remote from the headend. In a conventional two-way data cable communication network of this type, each of the nodes connected to the headend is uniquely identified by a coded address so as to allow for unique communication in both directions between the headend and the nodes.

As a result of forward equalization, different conditions and variations on the cable between the plural nodes and the headend, and the different distances between the nodes and the headend, as well as variations in the output levels and gains of individual node transmitters, the signal level received at the headend from the nodes in the network may vary considerably, and such variation in received signal level may, in turn, produce communication errors such as channel resolution inequities.

As noted in a copending application, Ser. No. 726,938, assigned to the assignee of this application, it has long been considered desirable that the levels of the signals received at the headend from each of the nodes be substantially equal so as to avoid these difficulties. In the past, attempts to achieve better signal equalization at the headend have included manually setting the transmit level at each node at the factory or at the time the node or terminal is installed and connected to the headend. These procedures have several obvious disadvantages in terms of cost, accuracy, and long-term effectiveness.

In the said copending application a system for achieving signal level equalization at the headend is described in which the signal levels received at the headend from each of the nodes are measured at the headend and compared there to a preset level to produce a node-level control signal. The latter signal is transmitted from the headend to the associated or addressed node at which the output signal level is modified in accordance with the received level control signal.

Although the signal equalizing arrangement disclosed in said copending application is generally effective to achieve the desired signal equalization at the headend, it requires a modification to the headend to control the levels transmitted from the nodes and does not equalize transmit level differences between remote terminal nodes at the same topological layers downstream from the headend, which may, as noted, result in undesirable inequities in channel contention resolution.

It is an object of the present invention to provide in a two-way cable data transmission network an arrangement for achieving signal level equalization at the headend in a reliable and automatic manner.

It is a further object of the present invention to provide a signal equalizing arrangement in a two-way cable communication system in which no signal-level processing is required at the headend and which compensates for channel variations in the network.

To these ends each node or terminal in the network transmits to the headend a test signal, including a node-identifying address signal, beginning at a minimum output level. The output level of the signal transmitted by the node is incrementally increased until a correct return signal retransmitted from the headend is detected at the node. At this output level the level of the signal received at the headend from the node is substantially the same as the signal levels received from the other nodes in the network connected via the cable to the headend. This signal equalizing process may be repeated at regular intervals to adjust for changing channel conditions.

To the accomplishment of the above and to such further objects as may hereinafter appear, the present invention relates to an automatic terminal signal equalization system, substantially as defined in the appended claims and as described in the following specification as considered together with the accompanying drawings in which:

The present invention finds utility in a multi-terminal or multi-node two-way cable data communication network in which data in binary form is transmitted bidirectionally between a headend 10 and a plurality of remote terminals or nodes $12_1$–$12_n$ by means of a cable 14. By means of the present invention, the signals received at the headend 10 from each of the nodes 12 is at essentially the same level irrespective of possible differences or variations in the cable between the plurality of nodes and the headend.

Figure 1:
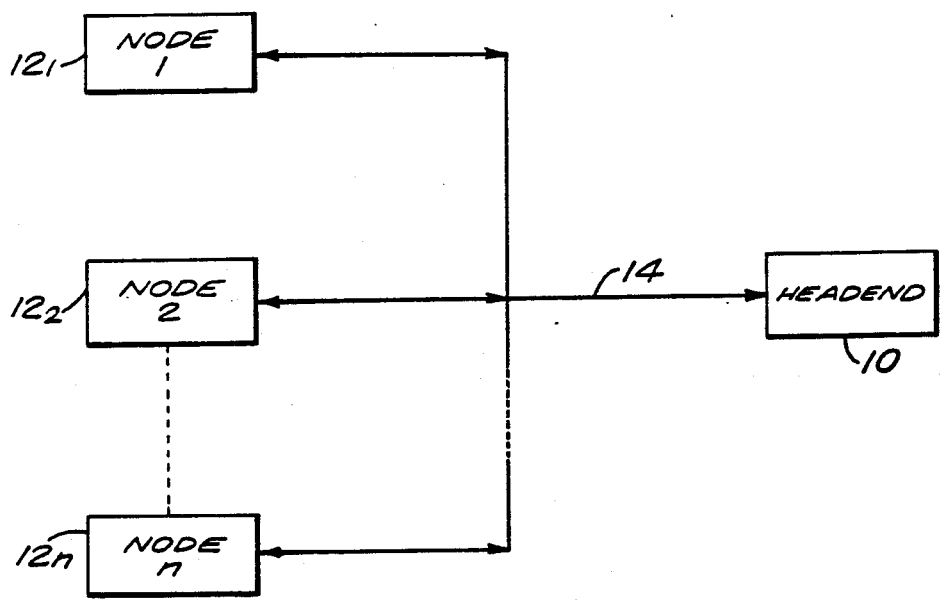
FIG. 1 is a schematic diagram of a multi-node cable communication network in which the present invention is employed.
Figure 2:
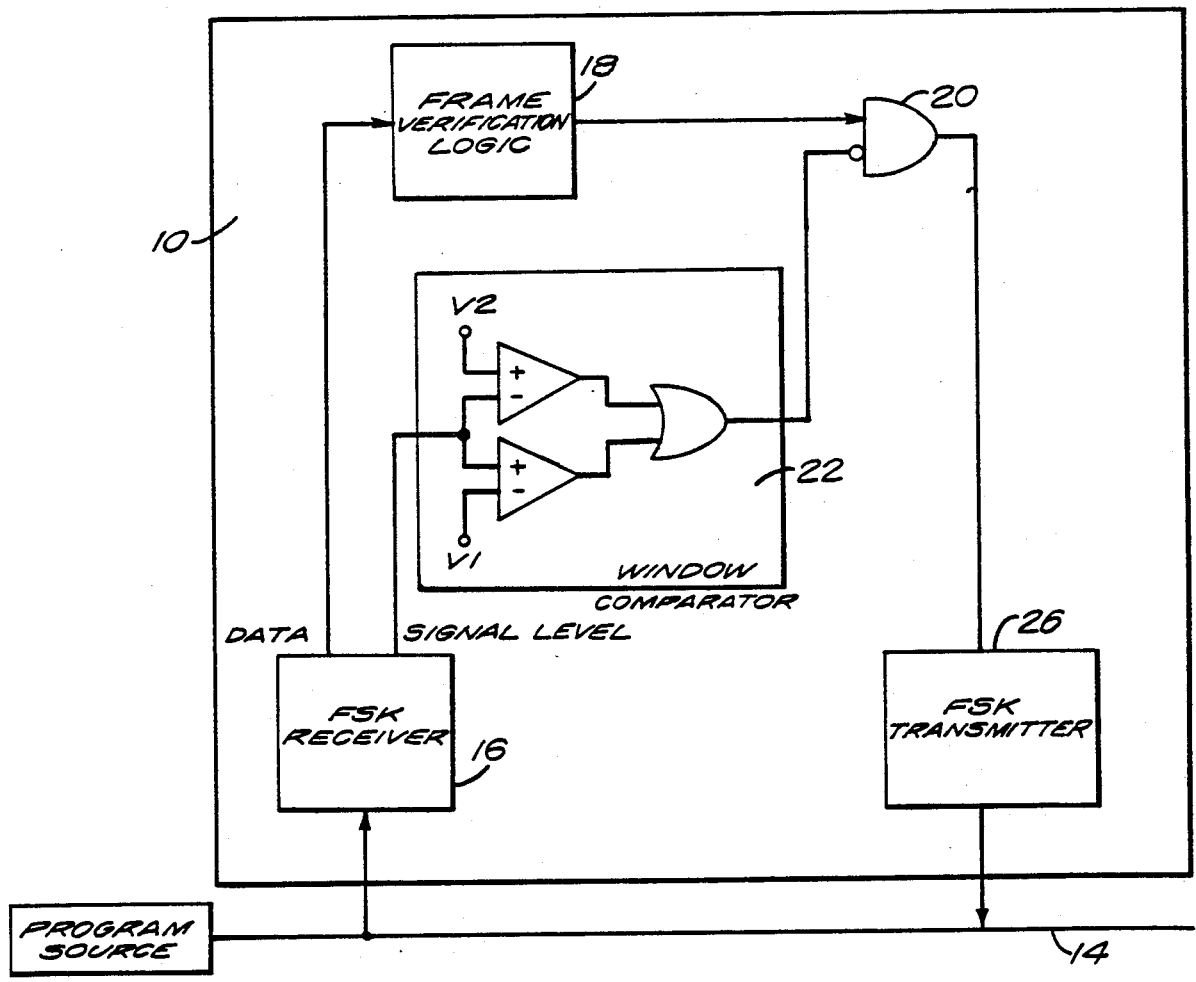
FIG. 2 is a schematic block diagram of a headend as used in the system of the invention.

To this end the headend 10 as schematically illustrated in FIG. 2, includes, as is per se conventional, an FSK receiver 16 and an FSK transmitter 26 both of which are connected to the cable 14. The FSK receiver has two outputs, one in the form of a binary data signal representing the data portion of a signal received at the node, and the second, a signal proportional to the level or amplitude of the received signal. The data signal is applied to a per se known frame verification logic circuit 18 the output of which is applied to one input of a NOR gate 20. The signal level output of FSK receiver 16 is applied to a window comparator 22, the output of which is applied to the inverted input of gate 20.

The window comparator, in the embodiment illustrated in FIG. 2, comprises a pair of operational amplifiers A1 and A2 each having a positive and a negative input. The positive input of amplifier A1 and the negative input of amplifier A2 are connected in common and to the signal level output of FSK receiver 16. The negative input of amplifier A1 is connected to a first reference voltage V1, whereas the positive input of amplifier A2 is connected to a second reference voltage V2. The outputs of amplifiers A1 and A2 are connected to the inputs of an AND gate 24, the output of which is the output of comparator 22 applied to one of the inputs of gate 20. The output of gate 20 is applied to an FSK transmitter 26, the output of which is connected to the cable 14 for transmission to the various terminals or nodes 12.

Figure 3:
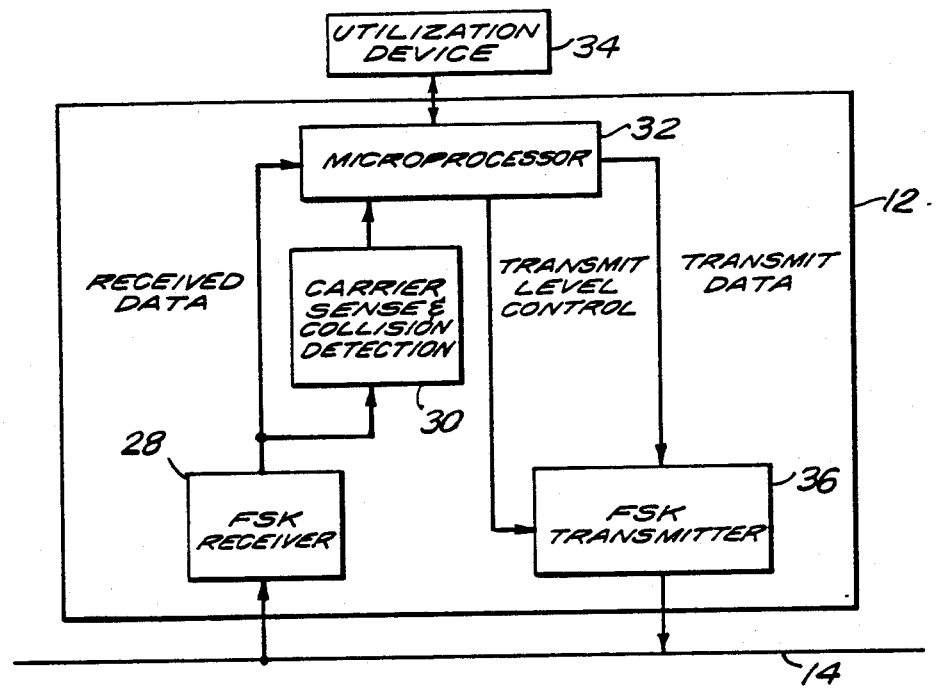
FIG. 3 is a schematic block diagram of a node or terminal in accordance with the invention.

Each of the nodes 12 one of which is illustrated schematically in FIG. 3 includes an FSK receiver 28 having an input connected to the cable 14 and an output connected both to a per se conventional carrier sense and collision detector 30 and to a microprocessor 32. The latter is also connected for bidirectional data communication with an external device 34, which may typically be a data terminal or television receiver.

The microprocessor 32 sends a transmit level control signal and a transmit data signal to the input of an FSK transmitter 36, the output of which is coupled to the cable 14 for transmission to the headend. The microprocessor 32 operates in part under the control of a stored program, the essential steps of which are illustrated in the flow chart of FIG. 4, to control the operation of the node FSK transmitter 36, and more particularly to incrementally increase the amplitude of the signal transmitted by the node FSK transmitter 36 until a signal transmitted to the headend from that node transmitter is received at a sufficient level at the headend so that the headend transmits a coded signal to the node which is detected at the node FSK receiver 28.

Figure 4:
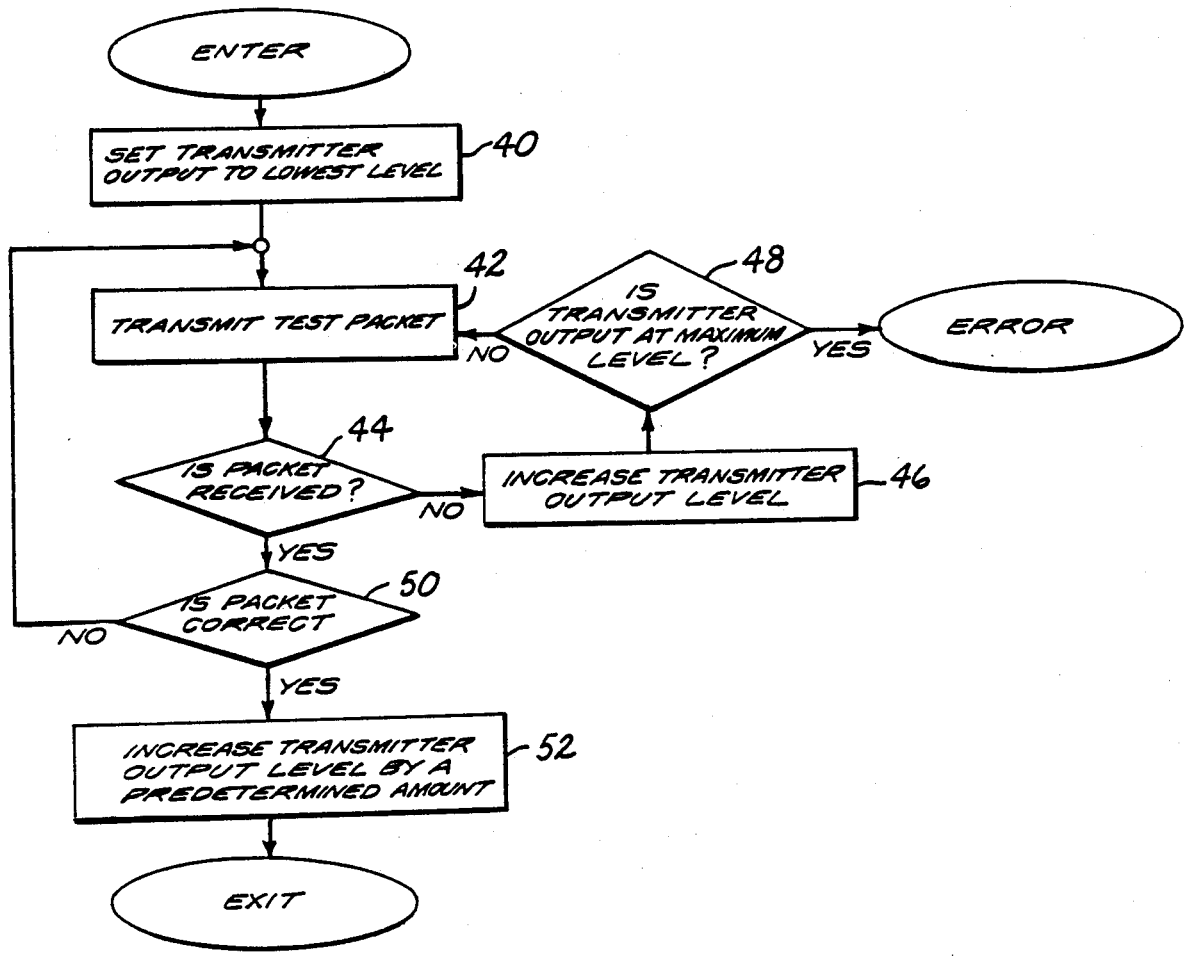
FIG. 4 is a flow chart of a portion of the program carried out in the microprocessor at the node at FIG. 3.

As shown in FIG. 4, the program under which the microprocessor 32 controls these operations is entered at step 40 which instructs the node FSK transmitter 36 to transmit a signal at a preset minimum or lowest level, e.g., in the range of 5 dbmv. Next, at step 42, the transmitter 36 is instructed to transmit at the selected lowest level a test packet which includes data bytes indicating in binary form the originating node and the destination of the test packet.

A determination is then made at step 44 to determine if a test packet previously transmitted to headend from that node at a preset level has been received at that node. If the determination made at decision step 42 is that a test packet has not been received, that is, if the level of the test signal previously transmitted from that node was insufficient to cause that signal to be received at a sufficient level at the headend, the node transmitter is instructed at step 46 to increase the transmitter output level, typically by an amount in the range of 2-3 db.

Thereafter a determination is made at step 48 to determine if at that time the node FSK transmitter 36 is already transmitting at its maximum output level. If this determination is affirmative, an indication is provided of an error, and the particular node is then examined to locate the source of the error. If the determination is made at step 48 that the node transmitter is not transmitting at its maximum output level, the program is repeated at step 42 and the test packet is again transmitted, this time at the increased output level.

If the determination made at step 44 is that a test packet has been received at the node, the decision is then made at step 50 to determine if the received packet is correct, that is, if the data contained in the test packet has not been corrupted as a result of the prior transmission along the cable of the test packet from the node to the headend.

If the determination made at step 50 is that the received data pocket has been corrupted and is thus not "correct", the program is returned to step 42 to transmit a new test packet. This procedure is repeated until a determination is made at step 50 that the received packet is correct. At this occurrence, the level of the signal transmitted from this node is sufficiently high to ensure that the level of the signal received at the headend from that node is within the prescribed equalized range of signals received from each of the nodes in the cable network, as desired. However, to ensure that the signal level from that mode will continue to be of a sufficient level to achieve such equalization, the output level of the node transmitter may be increased by a still further increment, in the range of 3-6 db, as at step 52. At this time, the transmitter-level program, as described, is exited.

In the operation of the equalization system of the invention, as hereinabove described, the node transmits a signal at a predetermined minimum level along the cable to the headend. The transmitted signal is in the form of a test packet containing inter alia a series of bytes identifying the node to the headend and other binary signals. The signal is received at the headend receiver 16, which, as described, produces a data signal output and a signal level output. The former is applied to the frame verification logic circuit 18, which in a known manner, verifies from the received data that the node from which that signal has been received is authorized to use, that is, transmit and receive data in the network. Upon such verification, an enabling signal is applied to one input of NOR gate 20.

The signal level output is applied to the window comparator 22, which compares the level against an upper limit V2 and a lower limit V1, so that when the received signal level falls within the preset signal "window", that is, it is less than V2 and greater than V1, the comparator 22 produces an enabling signal to the inverted input of gate 20. When both inputs to gate 20 are at the enabling level, the output of gate 20 is placed at a level to enable the FSK transmitter 26 to retransmit the received test packet to the node from which the signal was received and analyzed at the headend to determine whether it was received at the proper level, to wit, a level that falls within the preset "window".

If the test packet signal received at the headend from the node is at a sufficient level to cause a signal to be retransmitted to the node, as described, that signal is received at the node FSK receiver 28. The thus-received signal is detected and applied to the microprocessor 32 and to the carrier sense and collision detect circuit 30. The microprocessor 32 processes the received data signal to control the level of output of the FSK transmitter 36 in accordance with its stored control program, as described above with respect to FIG. 4. The circuit 30 operates in a per se known manner, in accordance with its algorithm implemented by firmware, to determine whether other nodes are at that time sending data along the cable network, thereby to allow only one node to operate on the network at any one time.

It will thus be appreciated from the foregoing description of an embodiment of the invention that signal level equalization is achieved at the headend of a multi-node data communication system in a reliable and automatic matter as desired. It will also be appreciated that although the present invention has been described hereinabove with respect to a single embodiment, it will be understood that modifications and variations may become apparent to those skilled in the art within the spirit and scope of the invention.

What is claimed is:

1. In a two-way cable communication system including a headend and a plurality of nodes connected by means of a cable to the headend, said nodes each comprising transmitter means and receiver means, and control means connected to said transmitter means and to said receiver means for incrementally increasing the output level of said transmitter in a plurality of preset steps from a preset minimum level to a level greater than said preset minimum level in the absence of the receipt at said node of a return signal from said headend, said headend comprising a receiver and a transmitter coupled to the cable, and means operatively coupled to the output of said receiver and to the input of said transmitter for comparing the signal received from said node against a preset detection level, said comparing means being effective when the signal received from the node is equal to or above said preset detection level to thereupon cause said headend transmitter to transmit a return signal to said node, said node control means further comprising means responsive to the reception of said return signal from said headend to alter the operation of said level incremental increasing means, thereby to establish a transmit output level at said node corresponding to the highest previous incremental output level of said node transmitting means that was sufficient to be received at said headend at or above said preset detection level.

2. In the system of claim 1, in which said control means in said node includes means for combining with the signal transmitted by said transmitting means a code uniquely identifying said node.

3. In the system of claim 2, in which said control means further includes means for further increasing the output level of said transmitter means by an additional amount above the minimum level sufficient to be received at the headend at or above said preset detection level.

4. A method for establishing substantially equal signal levels received at a headend from a plurality of nodes connected to the headend by a cable, said method comprising the steps of:
 transmitting from each node a signal initially at a preset minimum level;
 thereafter, in the absence of a return signal received at said node from the headend, increasing the level of the signal transmitted at each of said nodes to the headend from said preset minimum level by a plurality of preset increments;
 detecting at the headend when the level of the signal received from each node is at or above a preset detection signal and then transmitting from the headend back to said nodes a return signal containing a signal uniquely identifying each node and indicating that the signal received at the headend from the node is at a predetermined acceptable level; and
 at each node, upon the reception of the appropriately coded return signal from the headend, thereafter controlling the level of the signal transmitted by said node, thereby establishing the signal level for subsequent transmission from the node to the headend at a level corresponding to the level of the signal previously transmitted from that node which was sufficient to be received at the headend at or above said preset detection level.

5. The method of claim 4, further comprising at the headend the steps of comparing the level of the signal received from a given node against a reference, and activating a transmitter to send the coded return signal to that node when the received signal level is equal to or exceeds said reference.

6. For use in a two-way cable communication system including a headend, a terminal adapted to be connected to the headend by a cable, said terminal comprising transmitter means, receiver means, and control means connected to said transmitter means and to said receiver means for increasing the output level of said transmitter from a preset minimum level in a plurality of preset incremental steps to a plurality of different levels greater than said preset minimum level until said terminal receives a return signal from the headend when the output level of said terminal transmitter means is sufficient for the signal transmitted thereby to be received at the headend at or above a preset minimum detection level, said terminal control means further comprising means responsive to the return signal transmitted to said terminal from the headend when the signal from said terminal previously received at the headend is at or above said preset minimum detection level for modifying the increase to the output level of said terminal transmitter means, thereby establishing the output level of said terminal transmitter means at a level corresponding to the lowest output level of said terminal transmitter means capable of producing a signal that when received at the headend is equal to or greater than said preset minimum detection level.

* * * * *